United States Patent [19]

von Bertrab Erdmann

[11] Patent Number: 4,736,543

[45] Date of Patent: Apr. 12, 1988

[54] HORTICULTURAL TREE

[76] Inventor: Guillermo von Bertrab Erdmann, Apartado Postal 6-636, Guadalajara, Jal., Mexico

[21] Appl. No.: 713,313

[22] Filed: Mar. 18, 1985

[51] Int. Cl.$^4$ .............................................. A01G 25/00
[52] U.S. Cl. ...................................................... 47/82
[58] Field of Search .................. 47/14, 39, 79, 80, 81, 47/82, 83

[56] References Cited

U.S. PATENT DOCUMENTS

| | | | |
|---|---|---|---|
| 1,688,407 | 10/1928 | Wastak | 47/14 |
| 1,959,510 | 5/1934 | Van Waveren | 47/84 |
| 3,293,798 | 12/1966 | Johnson | 47/83 |
| 3,452,475 | 7/1969 | Johnson | 47/79 |
| 3,650,384 | 3/1972 | Pegg | 47/39 X |
| 3,961,444 | 6/1976 | Skaife | 47/79 |
| 4,006,559 | 2/1977 | Carlyon | 47/82 |
| 4,124,953 | 11/1978 | Patton | 47/84 |
| 4,419,843 | 12/1983 | Johnson | 47/82 |

Primary Examiner—James R. Feyrer

[57] ABSTRACT

The invention relates a new embodiment for a multitray vertical planter fed basically by capillar water action, which enables easy handling for commercial distribution, and also the possibility of rotating the planter for adequate sunning or decorative purposes. In its erected position the planter consists of a closed water deposit which holds a succession of trays for containing soil and supporting structures thereof on top of its rotatory lid. Said rotation of the planter being achieved through ball bearings at the contact edges of the water deposit and its lid. The contact between soil and water being achieved through a conducting valve, which serves two purposes: draining the soil and feeding in capillar water. In its packed presentation, both, the water deposit and its lid contain nested all building parts: the frustoconical trays, the supporting structures and the conducting valve.

2 Claims, 2 Drawing Sheets

PRIOR ART

U.S. Patent Apr. 12, 1988 Sheet 2 of 2 4,736,543
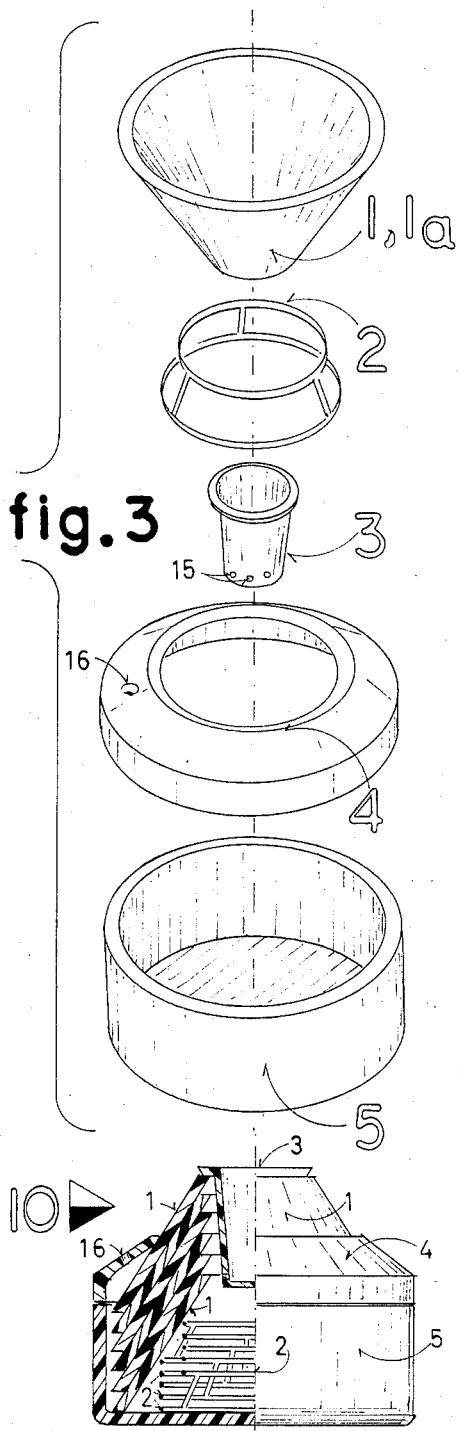
fig.3
fig.4
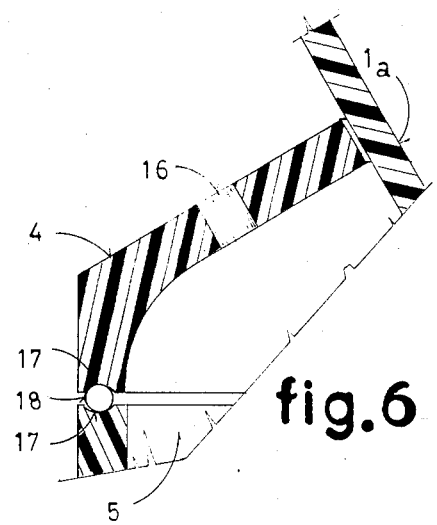
fig.6
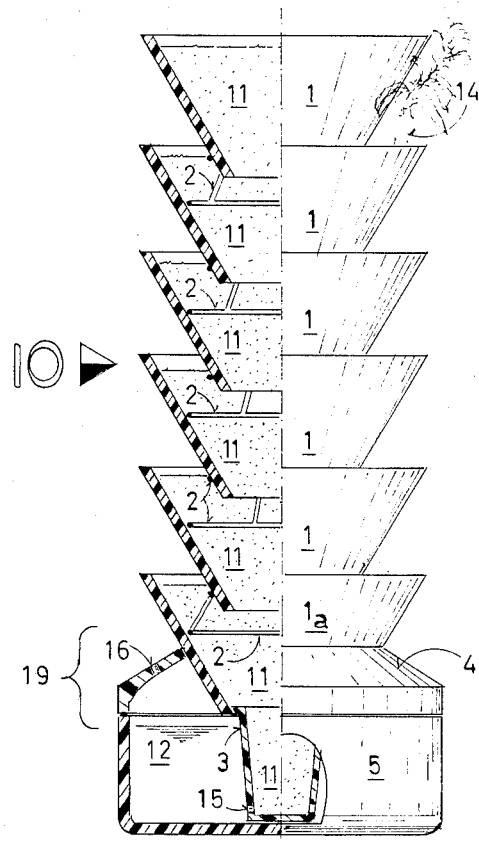
fig.5

HORTICULTURAL TREE

FIELD OF INVENTION

This invention relates to natural irrigated vertical planters for vegetable, species or flower growth in small ground areas.

PRIOR ART

Although some previous arrangements for vertical planters doe exist. I will refere only to the system deviced by Mr. Teófilo Aguilar, which singles out for using the capillar action of soil or growing media for the transmission of a considerable part of water needed by the plants, and sets therefore a closed water deposit as fundament for the build-up of the vertical planter.

Mr. Aguilar's device utilices a cubic water deposit and above it a sequence of frustoconical trays opened at their bottom and cilindrical supporting elements; and as a conducting media a pipe is used within the deposit to achieve contact between soil and water, having the water deposit a hole for filling.

In fact, the system comprises one body of soil which being in contact with water below, takes out the deposit water needs and drains out into it water excesses.

Other properties of the system are than erosion reduces notably, and since the system is quite water tight, water consumption is reduced considerably.

Further still, the simplicity of the system and the independence of its planter, makes it accessible for all people and practically for all places; a product mostly suited for urban use.

However, Mr. Aguilar's invention, being adequate for every household as a vertical planter, falls short in meeting some marketing, some agricultural and aesthetical demands.

SUMMARY OF THE INVENTION

It is an object of this invention to provide a product system suitable for commercial distribution of vertical planters.

It is a further object to provide a vertical planter in which sunning can be adjusted to plant needs or one's wishes.

It is still an object to provide a vertical planter where the supporting elements don't show and don't interfere with harvesting labors.

It is finally an object of this invention to provide a vertical planter where there is possible to have one tray more as in the system described under "Prior Art".

The above objects are achieved by following embodiment: the deposit is cylindrical and with its lid builds a packing unit where all other parts, the frustoconical trays, the supporting structures and a conducting valve can be nested. The deposit lid being rotatory edge on edge over the water deposit; the supporting structures being also of frustoconical shape; and the conducting valve being closed at its bottom. When built up, the frustoconical structures will be below soil level, and height gained through change from cubical to cilindrical deposit, will allow for same amount of water and planter height one tray more.

BRIEF DESCRIPTION OF THE DRAWINGS

The novel features considered characteristic of the invention are set forth in appended claims. However, they can be beteer understood when read in connection with following six figures:

FIG. 3 shows in perspective the building elements needed by the planter under the embodiment of the invention;

FIG. 4 is a partial cross section and a partial side view os same planter when packed for delivery;

FIG. 5 is a partial cross section and a partial side view of the same planter when erected; and, FIG. 6 is a cross sectional view of a possible rotating solution for the same planter.

DETAILED DESCRIPTION OF THE DRAWINGS

Figure 1:
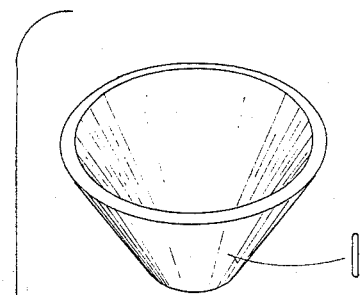
FIG. 1 shows in perspective the building elements required by the prior art planter.
Figure 1:
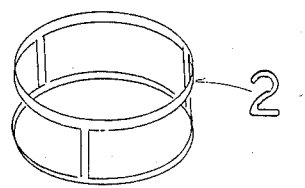
Figure 1:
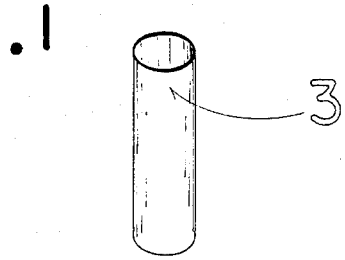
Figure 1:
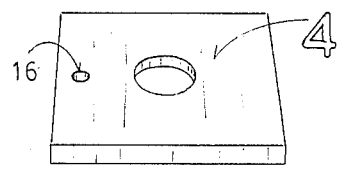
Figure 1:
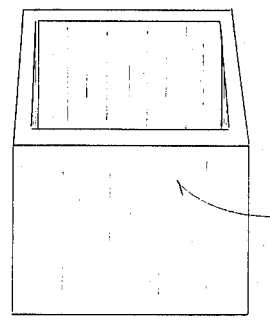
Figure 2:
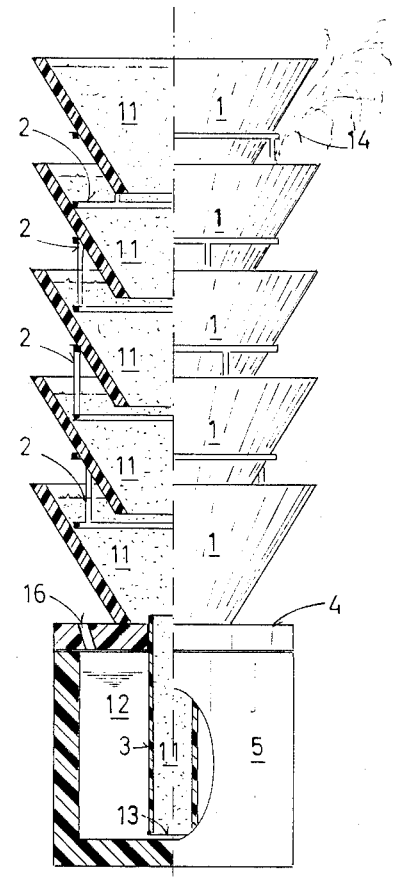
FIG. 2 is a partial cross section and a partial side view of the prior art planter.

Referring to FIG. 1 and FIG. 2 which relate to the vertical planter under prior art, the planter is composed of a plurality of frustoconical trays 1 opened at both ends, which are supported by cylindrical structures 2 that carry the planter load from the outside of tray above to the inside of tray below, being all carried by a rectangular lid 4 with two openings, one for water and the other to give way to a pipe 3, which will rest above the cubic deposit 5, in which through pipe 3 opened at both ends, contact between soil or growing media 11 and water or feeding solution 12 is achieved at edge 13.

It is easily observable from shape and proportions of building elements shown at FIG. 1, that there is no way of packing them together. It can also be realized from FIG. 2 that the supporting structures show above soil level, interfering with outside growing areas of plants 14.

FIGS. 3 through 6 refere to preferred embodiment of the invention, the Horticultural Tree 10. In FIG. 3, the building elements are exhibited; a frustoconical tray 1 opened at both ends; a supporting structure 2 of also frustoconical shape composed of two rings different in size which are held together by inclined rods; a lid 4 shaped also frustoconical as a ring opened at both ends, which has a hole 16 for level measuring and filling purposes; a cylindrical water deposit 5 of same circular size as lid 4, with an inner diameter bigger than the outside diameter or trays 1; and a perforated valve 3 closed at its bottom, with a similar hight as water deposit 5 and some perforations 15.

As can be seen FIG. 4, which shows a partial cross section and a partial side view of packed Horticultural Tree 10, all building parts can be nested together; the supporting elements 2 can be nested under the first tray, which carries remaining nested trays 1; the conducting valve 3 being also nested through the top hole left by nested trays 1; and, all these pieces together find adequate room in the packing unit composed by lid 4 and water deposit 5.

In FIG. 5, the Horiticultural Tree 10 is shown in its operating standing position: trays 1 hold soil or growing media; supporting elements 2 build a stand for the trays, driving the weight from bottom of above tray to the inside of tray below, being the supporting elements totally covered by soil 11; the whole set, soil 11, trays 1 and supporting elements 2 being carried by the frustoconical lid 4, which rests wall on wall over the water deposit 5; the conducting valve 3 hanging from the inner side of tray 1a, and through perforations 15 in its lower part, contact between soil 11 and water 12 is made possible: for capillar action and draining purposes. Naturally, the lid 4 is so designed that the first tray 1a will not reach the highest water level in deposit 5.

Finally, FIG. 6 shows in an enlargement 19 of FIG. 5, the preferred rotation solution, composed by two opposing grooves 17 in corresponding walls of lid 4 and water deposit 5 with ball bearings in between: 18.

Having described my invention, I claim:

1. In a multiple level plant assembly having a base container which serves as a reservoir, a lid for the base container, a plurality of frustoconical modular tray elements for containing soil, and a plurality of support frame elements for stacking the tray elements in spaced relation in the vertical direction, and means to communicate soil within trays to liquid within the reservoir through capillarity, the improvement comprising:

a reservoir lid having a frustoconical shape defining a lower opening matable with the top opening of said base container, and defining a top opening which accomodates one said frustoconical trays at a level intermediate the top and bottom thereof;

a plurality of frame elements of a frustoconical shape, each frame element defining a first supporting adapted to engage the inside surface of a first tray and a second support ring adapted to engage the outside surface of a second tray, said plurality of support elements being nestable, and a volume defined by said frame elements when nested which is less than the volume defined by one of said tray elements;

a conducting valve adapted to engage hanging from a first tray as communication mean between water and soil, which is also nestable through hole defined by nested trays; and, the reservoir defining a volume large enough to accomodate said trays when nested, whereby the support elements when nested can be stored within the reservoir of said base container.

2. The improved multiple plant growing assembly as defined in claim 1 which further includes a groove in the top edge of said base container, and an opposing groove in the reservoir lid, and ball bearings between said grooves, whereby the lid may be rotatably adjusted.

* * * * *